(12) United States Patent
Flisikowski et al.

(10) Patent No.: US 7,386,096 B2
(45) Date of Patent: Jun. 10, 2008

(54) METHOD OF MANUFACTURING A WINDOW TRANSPARENT FOR ELECTRONS OF AN ELECTRON BEAM IN PARTICULAR OF AN X-RAY SOURCE

(75) Inventors: Peter Flisikowski, Vaals (NL); Joachim Meys, Alsdorf (DE); Werner Lesmeister, Alsdorf (DE); Bernd R. David, Huettblek (DE); Peter Klaus Bachmann, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 112 days.

(21) Appl. No.: 10/574,452

(22) PCT Filed: Oct. 6, 2004

(86) PCT No.: PCT/IB2004/051996

§ 371 (c)(1),
(2), (4) Date: Apr. 4, 2006

(87) PCT Pub. No.: WO2005/034167

PCT Pub. Date: Apr. 14, 2005

(65) Prior Publication Data

US 2007/0010120 A1    Jan. 11, 2007

(30) Foreign Application Priority Data

Oct. 7, 2003    (EP)    .................. 03103708

(51) Int. Cl.
*H01J 5/18*    (2006.01)

(52) U.S. Cl. ...................................... 378/140; 378/121
(58) Field of Classification Search ................ 378/121, 378/140, 119, 161
See application file for complete search history.

(56) References Cited

U.S. PATENT DOCUMENTS

2002/0048345 A1*    4/2002    Bachmann et al. ......... 378/121

* cited by examiner

*Primary Examiner*—Courtney Thomas
(74) *Attorney, Agent, or Firm*—Larry Liberchuk

(57) ABSTRACT

The present invention relates to a method of manufacturing a window transparent for electrons of an electron beam (E), in particular of an X-ray source. In order to enable a less costly and elaborate manufacture of such a window and in order to prevent unwanted sharp edges in a window area which may damage the window foil (2), a method is proposed comprising the steps of:—providing on a surface (11) of a carrier element (1) to which a window foil (2) shall be fixed a receiving area (13, 16) for receiving a soldering material (3) used for fixing said window foil (2) to said carrier element (1), said carrier element (1) comprising a through hole (12) for the transmission of said electrons (E),—covering said surface (11) having said receiving area (13, 16) with a soldering material (3) such that substantially only said receiving area (13, 16) is filled with soldering material (3),—placing said window foil (2) on top of said surface (1) and—heating said soldering material (3) for fixing said window foil (2) to said surface (11).

20 Claims, 6 Drawing Sheets

Figure 1:
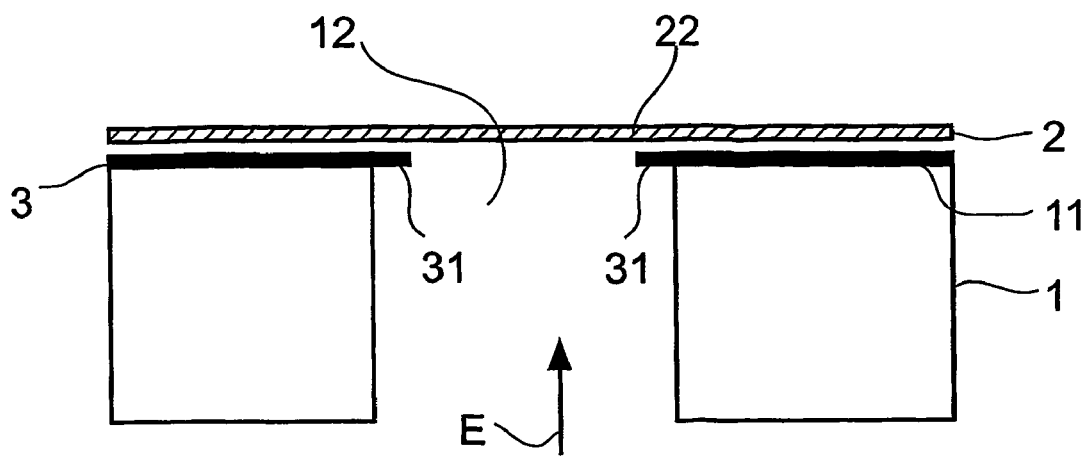

METHOD OF MANUFACTURING A WINDOW TRANSPARENT FOR ELECTRONS OF AN ELECTRON BEAM IN PARTICULAR OF AN X-RAY SOURCE

The present invention relates to a method of manufacturing a window transparent for electrons of an electron beam, in particular of an X-ray source. Further, the present invention relates to such a window as well as to an X-ray source including such a window.

An X-ray tube having a liquid metal target is known from U.S. Pat. No. 6,185,277 B1. The electrons emitted by an electron source enter the liquid metal through a thin window and produce X-rays therein. The liquid metal, having a high atomic number, circulates under the influence of a pump so that the heat produced by the interaction with the electrons in the window and the liquid metal can be dissipated. The heat generated at this area is dissipated by a turbulent flow, thus ensuring effective cooling.

The window is constructed in such a manner that on the one hand it is as stable as possible so as to withstand the flow pressure of the circulating liquid metal, and that on the other hand it should draw as little as possible energy from the electrons. A suitable material for the window is diamond, other materials are, for instance, beryllium, tungsten or a tungsten alloy. During operation the window is subjected to extreme conditions such as temperatures up to 1000° C. and pressures up to 10 bar. Further, the window is subjected to a corrosive influence of the liquid metal.

Such a window is generally manufactured by use of a high temperature soldering process. Therein, the thin window foil having a typical thickness of below 10 μm, for instance 5 μm, is soldered onto a carrier element, such as a metal frame made of molybdenum, using an active soldering material. In a first step the soldering material has to be formed in a thickness in the order of magnitude of the window foil thickness. The metal frame has a slit-like opening of a several square millimeters size which is covered by the window foil. Metal frame, soldering layer and window foil are then stacked upon each other and finally soldered at a temperature of approximately 950° C.

A drawback of this manufacturing method is, on the one hand, the elaborate and costly way of manufacturing the solder layer and, on the other hand, the intrusion of excessive soldering material into the window area. This means that the electrons are not able at positions, where such soldering material intrudes into the window area, to penetrate through the window foil into the liquid metal, but are already absorbed in the window area. Furthermore, the intruding soldering material forms an undefined, possibly sharp edge in the window area which may be a weak spot as regards the strain of the window.

It is thus an object of the present invention to provide an improved method of manufacturing a window transparent for electrons of an electron beam, in particular for use in an X-ray source as described above, which avoids these drawbacks and is, in particular, less costly and elaborate. It is a further object of the present invention to provide a window manufactured according to this method as well as an X-ray source having such a window.

This object is achieved according to the present invention by a method as claimed in claim 1, comprising the steps of:

providing on a surface of a carrier element to which a window foil shall be a fixed a receiving area for receiving a soldering material used for a fixing said window foil to said carrier element, said carrier element comprising a through hole for the transmission of said electrons, covering said surface having said receiving area with a soldering material such that substantially only said receiving area is filled with soldering material, placing said window foil on top of said surface and heating said soldering material for fixing said window foil to said surface.

The present invention is based on the idea to provide a structuring in one surface of other carrier element prior to soldering of the window foil to said carrier element in order to provide a receiving area therein for receiving the soldering material as a kind of solder depot. This receiving area shall prevent the intrusion of excessive soldering material into the window area, in particular into the through hole of the carrier element. After said structuring for providing said receiving area, the surface with said receiving area is covered with soldering material such that the soldering material is only provided in the receiving area. Thereupon the window foil is placed and soldered by heating the soldering material which thus flows into the area between the window foil and the carrier element due to capillary forces to sufficiently fix the window foil to the surface of the carrier element. It is thus prevented that excessive soldering material flows into the through hole and forms undefined or sharp edges which may damage the window foil during operation.

Preferred embodiments of the invention are defined in the dependent claims. The invention also relates to a window for the transmission of electrons of an electron beam, in particular for use in an X-ray source, comprising:

a carrier element for carrying a window foil, said carrier element comprising a through hole for the transmission of said electrons, a window foil soldered on a surface of said carrier element, wherein said surface of said carrier element is provided with a receiving area filled with a soldering material used for a fixing said window foil to said carrier element.

Still further, the present invention relates to an X-ray source having an electron source for emitting an electron beam, a target for emitting X-rays upon incidence of said electron beam and a window as described above, said window being located between said electron source and said target. In an embodiment, the X-ray source comprises a liquid metal target and is of the type as disclosed in U.S. Pat. No. 6,185,277 B1.

In a preferred embodiment the step of covering said surface having said receiving area comprises two sub-steps. In a first sub-step the complete surface is covered with soldering material, i.e. not only the receiving area. In a second sub-step, excessive soldering material is removed, for instance-using a milling or grinding process so that essentially only said receiving area is finally filled with soldering material. Preferably, said receiving area comprises one or more grooves around said through hole in said carrier element. These grooves are, for instance, made by use of a milling cutter or a laser and can, for instance, have a depth of 50 μm and a width of 50 μm when said window is to be used in an X-ray source having a liquid metal target. Such grooves can be easily made and efficiently receive soldering material. The grooves may have different cross-sections, such as rectangular or triangular cross-sections. However, semi-circular cross-sections of the grooves are preferred, since the soldering material can develop free of pores therein. In corners having sharp edges of sharp or rectangular grooves bubbles can be formed in the soldering material, which prevent a complete moistening or covering by the soldering material. The better the grooves are filled with soldering material, the more evenly will be the layer of soldering material in the plane facing the window foil.

In another embodiment the grooves are concentric around said through hole, i.e. the receiving area comprises a number of grooves having a different radius around said through hole. In this embodiment it is avoided that soldering material flows from one groove into another groove. However, the grooves may also be provided spirally around said through hole.

According to an alternative embodiment the receiving area is made by ablating the surface of said carrier element to which said window foil shall be fixed so as to obtain a carrier element having an inclined surface with a height decreasing from said through hole to its edge. Thus, the carrier element has a sloping surface so that there exists a wedge-shaped gap between this surface and the plane window foil when placing it on top of said surface.

In order to further avoid that the window foil gets damaged at the inner edges of the carrier element, the edge of the surface of the carrier element facing the through hole is rounded.

In addition to forming grooves or a wedge-shaped gap as receiving area, a channel may be further provided closely surrounding the through hole for preventing soldering material to flow into the through hole. For instance, in the embodiment where the receiving area comprises a number of grooves the inner-most groove may be provided as such a channel, having an increased depth and/or width compared to the other grooves.

In still a further embodiment the carrier element comprises a top carrier element and a bottom carrier element, said receiving area being provided in said top carrier element and said window foil being fixed to said top carrier element before said top carrier element being soldered to said bottom carrier element. Preferably, for soldering the window foil to the top carrier element a soldering material having a high soldering temperature is used while for soldering, in a subsequent step, the top carrier element to the bottom carrier element, a soldering material having a lower soldering temperature is used.

By splitting the process into two sub-processes a high number of windows can be manufactured in one batch. After the first sub-process the non-optimal windows (top carrier elements) can be easily sorted out, so that the much more expensive bottom carrier elements are subsequently only fixed to optimum top carrier elements, leading to a cost reduction.

Figure 2A:
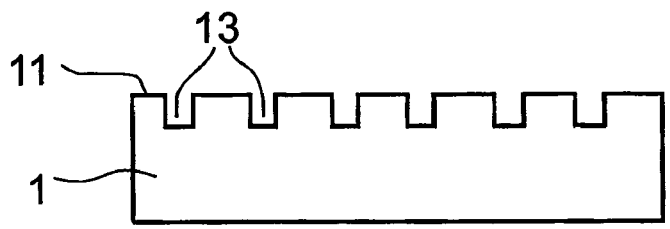
Figure 2B:
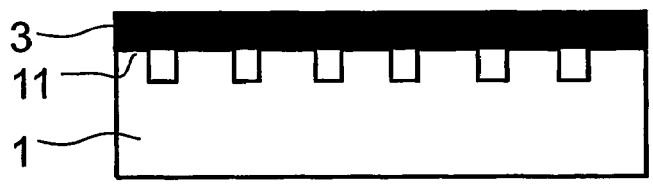
Figure 2C:
Figure 2D:
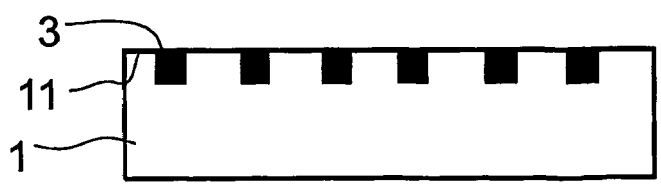
Figure 2E:
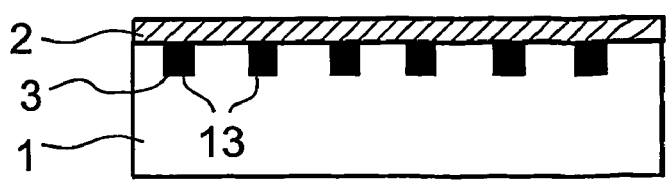
Figure 3:
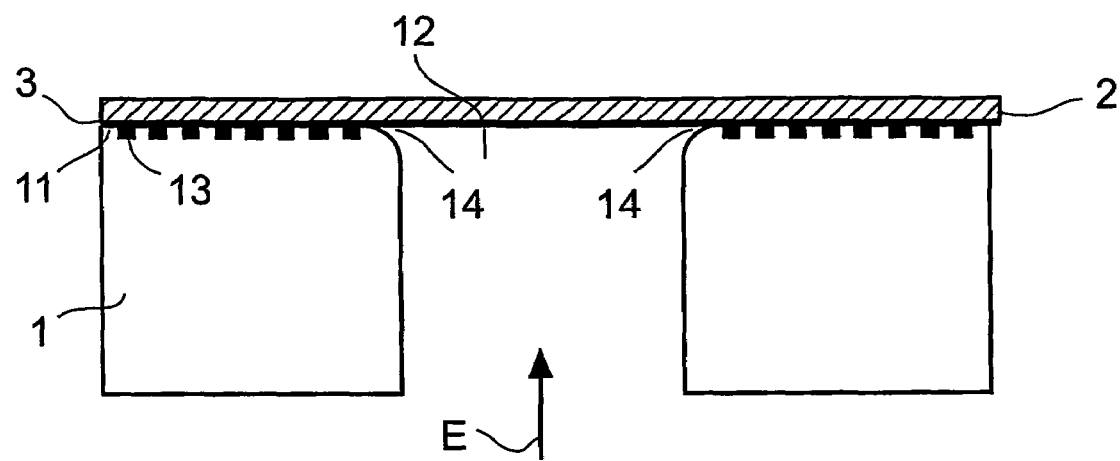
Figure 4:
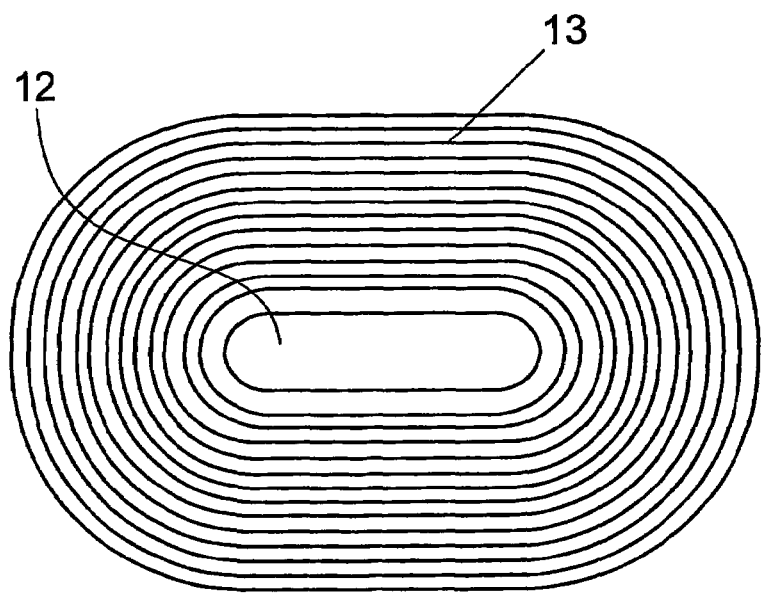
Figure 9:
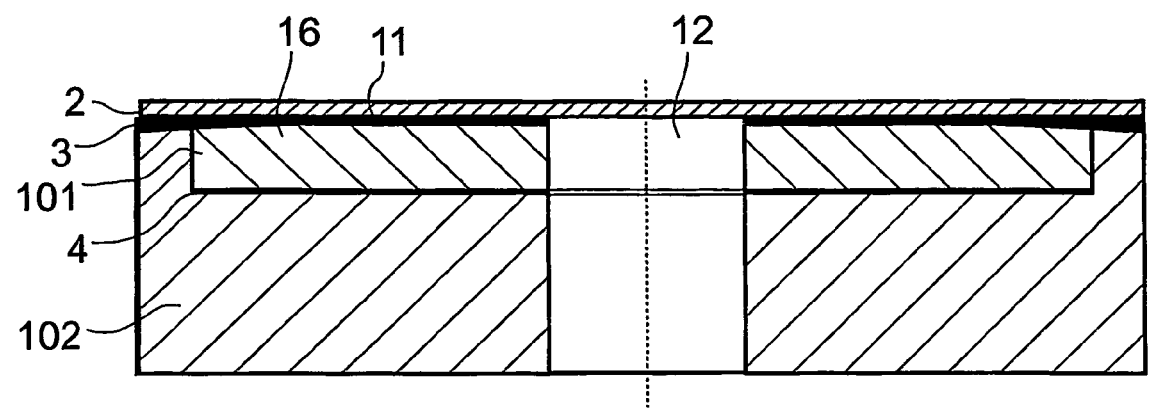
Figure 10:
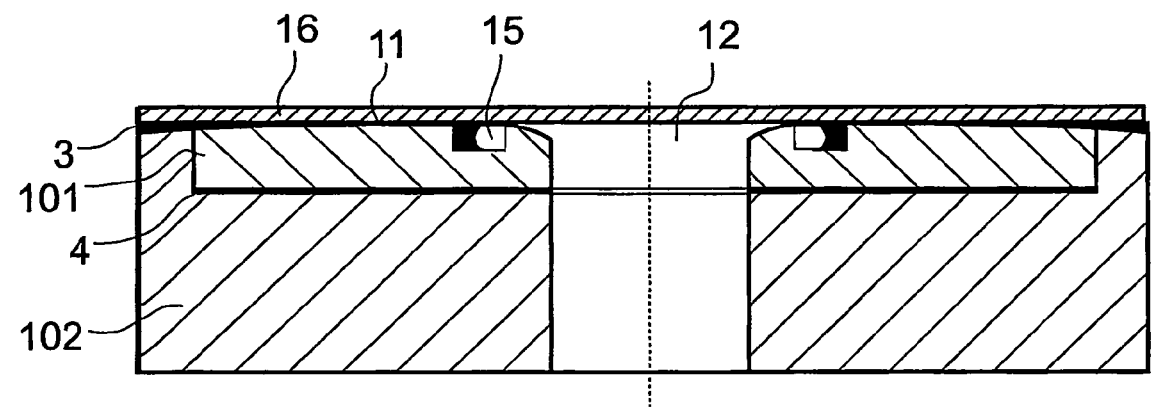
Figure 11:
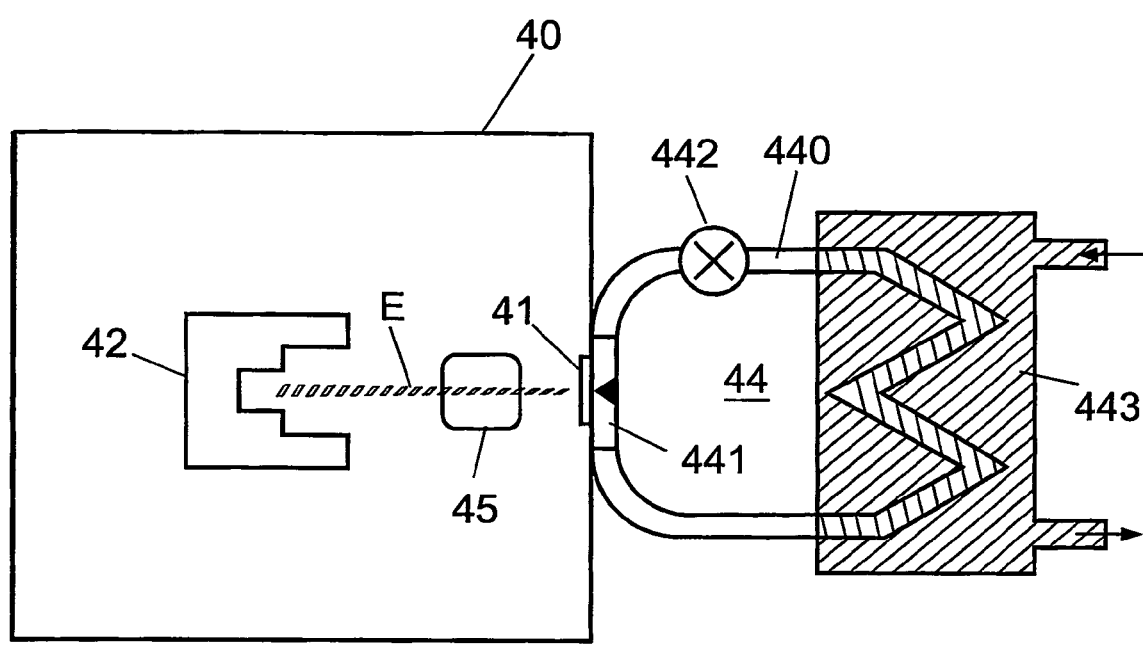

The present invention will now be explained in more detail with reference to the drawings in which FIG. 1 shows a window manufactured by a known method, FIG. 2 illustrates the steps of the method according to the present invention, FIG. 3 shows a window manufactured according to the method of the invention, FIG. 4 shows a top view on the receiving area, FIGS. 5 to 10 show different embodiments of a window manufactured according to different embodiments of the method of the invention, and FIG. 11 shows an X-ray source according to the present invention.

FIG. 1 shows a window manufactured by a known manufacturing method. It comprises a metal carrier element 1 and a window foil 2 soldered on the top surface 11 of the carrier element. For soldering the window foil 2 to the carrier element 1 the soldering material 3 is first put on top of the surface 11. In an elaborate processing the soldering material 3 has to be treated to be of the same size in thickness as the window foil 2 whereafter the soldering material 3 is heated to a temperature of approximately 950° C. to fix the window foil 2 to the carrier element 1.

The central part 22 of the window foil 2 covers a through hole 12 provided in the center of the carrier element 1. The window foil 2 thus serves to separate liquid metal, in case of use of the window in an X-ray source having a liquid metal target, from a vacuum area. During operation an electron beam E of electrons transmits the window foil 22 in order to enter the liquid metal and produce X-rays therein.

As can be seen in FIG. 1 part of the soldering material 3 is, during heating of the soldering material, intruded into the through hole 12 and forms an undesired solder portion 31. These avoid electrons from penetrating into the liquid metal at these areas and thus reduce the efficiency of the X-ray source. Further, these portions 31 may form an undefined edge which may either destroy or damage the window foil 2 during operation.

The steps of the manufacturing method according to the present invention are illustrated in FIG. 2. Therein, a cross-section through only a part of the carrier element or the manufactured window, respectively, is shown. In a first step, illustrated in FIG. 2a, the carrier element is provided with a number of concentric grooves 13 formed in the surface 11 around the through hole 12 (not shown here). These grooves 13 constitute a so-called receiving area for receiving soldering material in a subsequent step.

In a second step, shown in FIG. 2b, a soldering material 3 is put on top of the pre-grooved surface 11. By heating the soldering material 3 it becomes fluid and flows, at least partly, into the grooves 13 which are finally filled with soldering material as shown in FIG. 2c. The thickness of the layer of soldering material 3 is primarily not of importance since in a subsequent step, as shown in FIG. 2d, excessive soldering material 3 which is still on top of the surface 11 but not in the grooves 13 is removed, for instance by grinding or milling so that essentially only in the grooves 13 soldering material 3 is present.

Finally, the soldering material 3 is heated without the use of any additional soldering material. The soldering material 3 present in the grooves 13 flows out of the grooves due to capillary forces into the area between the window 2, which has been put on top of the surface 11, and the surface 11 itself and finally provides a secure fixture between the window foil 2 and the carrier element 1, as shown in FIG. 2e.

A window according to the present manufactured by the above described method is shown in FIG. 3. Shown are the carrier element 1 with the pre-grooved surface 11 having grooves 13 filled with soldering material 3 which has filled the area between the surface 11 and the window foil 2 when being heated. As can be seen from FIG. 3, no soldering material 3 has come into the through hole 12 so that neither the efficiency is reduced nor undesired and sharp edges are formed which may damage or destroy the window foil 2. In order to further prevent any damage of the window foil the edges 14 of the surface 11 facing the through hole 12 are rounded, i.e. comprise a curved radius.

A top view on the surface 11 of the window shown in FIG. 3 is depicted in FIG. 4. Therein the through hole 12 which has the form of an elongated hole is surrounded by a number of grooves which are approximately concentric around the through hole 12. Such grooves 13 can, for instance, easily be made by use of a milling cutter or a laser.

Figure 5:
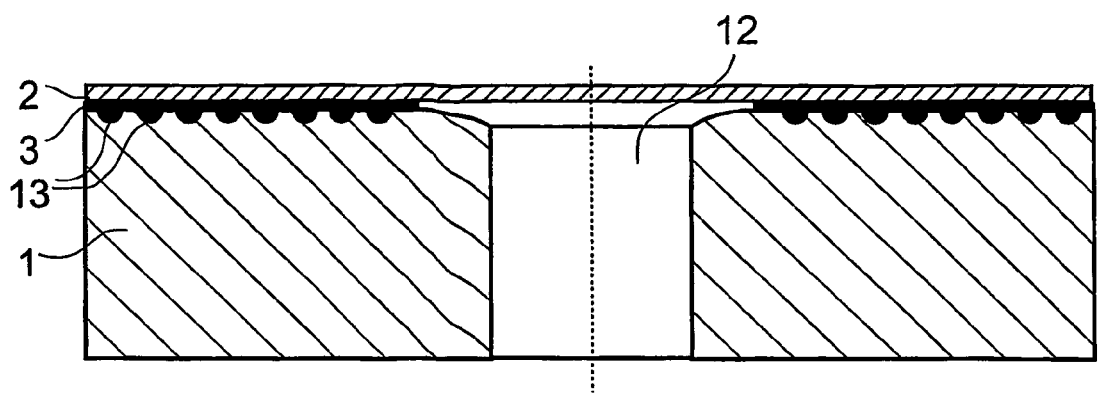

FIGS. 5 to 10 show, as a cross-section, further embodiments of a window according to the present invention at which different modifications of the manufacturing method and the window are illustrated. For instance, as shown in FIG. 5, the grooves 13 have a semi-circular cross-section while in the embodiment shown in FIG. 2, the grooves 13 have a rectangular cross-section.

Figure 6:
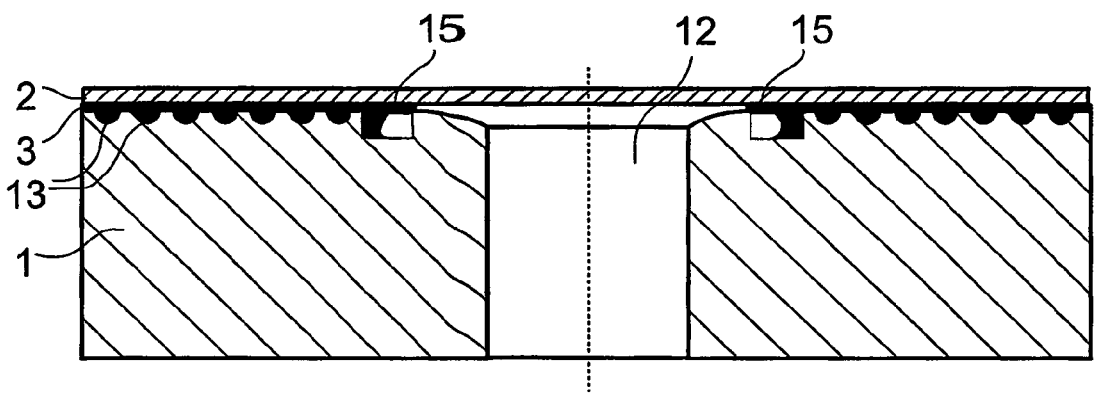

In the embodiment shown in FIG. 6 an additional channel 15 is provided as inner-most groove having an increased width and depth compared to the grooves 13. This additional channel 15 serves as stopping groove for stopping any soldering material 3 flowing in the direction of the through hole 12 in order to prevent that the soldering material flows into the through hole 12.

Figure 7:
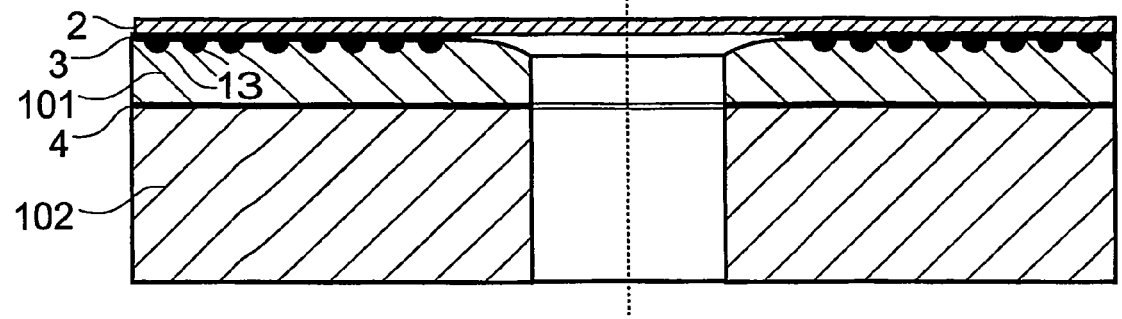

In the embodiment shown in FIG. 7 the carrier element 1 is divided into a top carrier element 101 and a bottom carrier element 102. While at first the grooves 13 are provided in the top carrier element 101 and the window foil 2 is soldered to the top carrier element 101 as described above, in a subsequent step the top carrier element 101 is soldered to the bottom carrier element 102 in which process soldering material 4 can be used having a lower melting temperature than the soldering material 3.

Figure 8:
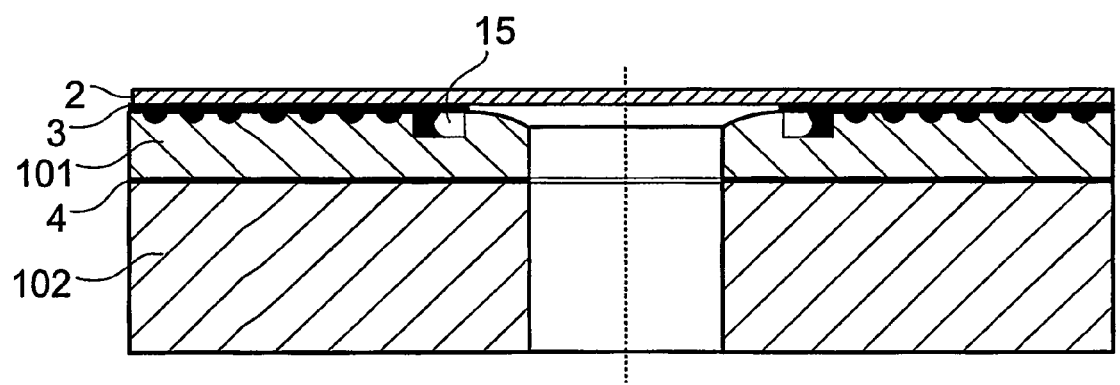

The embodiment shown in FIG. 8 mainly corresponds to the embodiment shown in FIG. 7 but includes an additional channel 15 as already shown and explained with reference to FIG. 6.

A different embodiment of a receiving area is shown in FIG. 9 where the carrier element 1 is also sub-divided into a top carrier element 101 and a bottom carrier element 102 soldered together by a soldering material 4. However, the top surface 11 of the top carrier element 101 does not have grooves as shown in previous figures but is inclined so as to form a wedge-shaped gap 16 between the window foil 2 and the surface 11. Said gap 16 has an increasing thickness from the side adjacent the through hold 12 to the outer edge and is provided for receiving the soldering material to prevents, due to the small thickness adjacent the through hole 12, that soldering material can flow into the through hole 12.

The embodiment shown in FIG. 10 corresponds to the embodiment shown in FIG. 9, but includes an additional channel 15 as already shown and explained with reference to FIG. 6.

An embodiment of an X-ray source according to the present invention in which such a window is preferably used, is shown in FIG. 11. It comprises a preferably electrically grounded tube envelope 40 which is sealed in a vacuum tight manner by the window 41. In the vacuum space of the tube envelope 40 there is accommodated an electron source in the form of a cathode 42 which emits an electron beam E in the operating condition, which electron beam E is incident, through the window 41, on a liquid metal present in a target system 44. The target system 44 includes a system of ducts 440 in which the liquid metal is driven by a pump 442 and flows past the outer side of the window 41 in a section 441. After having past the section 441, it enters a heat exchanger 443 wherefrom the heat produced can be drained by means of a suitable cooling circuit. The interaction between the electrons passing through the window 41 and the liquid metal produces X-rays, i.e. the liquid metal serves as a target, which emanate through the window 41 and an X-ray window 45 in the envelope 40. For further details of the X-ray source reference is made to the above mentioned U.S. Pat. No. 6,185,277 B1 which is herein incorporated by reference.

The invention claimed is:

1. Method of manufacturing a window transparent for electrons of an electron beam in an X-ray source, comprising the steps of: providing a carrier element with a surface and an opening therethrough;
   forming one or more grooves in the surface;
   filling the grooves with a soldering material;
   positioning a window foil along the surface and covering the opening;
   providing heat to the soldering material so that portions of the soldering material flow out of the grooves and between the carrier element and window foil due to capillary action; and
   allowing the soldering material to cool to connect the window foil to the carrier element, wherein the opening is substantially free of the soldering material.

2. Method as claimed in claim 1, further comprising removing excessive soldering material from the surface prior to the positioning of the window foil thereon.

3. Method as claimed in claim 1, wherein the one or more grooves are a plurality of grooves concentrically aligned with the opening.

4. Method as claimed in claim 3, wherein said plurality of grooves each have a semi-circular cross-section.

5. Method as claimed in claim 3, wherein at least one of said plurality of grooves has a larger cross-section than another of said plurality of grooves.

6. Method as claimed in claim 1, wherein said surface is formed by ablating of said carrier element so as to obtain an inclined surface with a height decreasing from the opening to an edge of the carrier element.

7. Method as claimed in claim 1, wherein an edge of the surface along the opening is rounded.

8. Method as claimed in claim 1, wherein the surface has an annular channel in proximity to the opening for preventing the soldering material from flowing into the opening.

9. Method as claimed in claim 1, wherein said carrier element comprises a top carrier element and a bottom carrier element, the surface being provided in said top carrier element and said window foil being fixed to said top carrier element before said top carrier element is soldered to said bottom carrier element.

10. Window for the transmission of electrons of an electron beam in an X-ray source, the window comprising:
    a carrier element having a surface and an opening for the transmission of said electrons therethrough;
    a window foil connected on the surface of said carrier element by soldering material, wherein said surface is inclined with a decreasing height towards an edge of the carrier element opposite to the opening, and wherein the opening is substantially free of the soldering material.

11. The window of claim 10, wherein the surface has at least one groove formed therein surrounding the opening and having a portion of the soldering material therein.

12. The window of claim 11, wherein the at least one groove has a semi-circular cross-section.

13. The window of claim 10, wherein an edge of the surface along the opening is rounded.

14. X-ray source comprising:
    an electron source for emitting an electron beam;
    a target for emitting X-rays upon incidence of said electron beam; and
    a window positioned between said electron source and said target, wherein the window has a carrier element having a surface and an opening for the transmission of said electrons therethrough, wherein the window has a window foil connected on the surface of the carrier element by soldering material, wherein the surface has at least one groove formed therein surrounding the opening and having a portion of the soldering material therein, and wherein, the opening is substantially free of the soldering material.

15. X-ray source as claimed in claim 14, wherein said target is a liquid metal target and wherein said window separates the liquid metal of said liquid metal target from a vacuum area comprising said electron source.

16. The X-ray source of claim 14, wherein the surface has a channel formed therein surrounding the opening, wherein the channel has a cross-section larger than a cross-section of the at least one groove, and wherein a portion of the soldering material is in the channel.

17. The X-ray source of claim 14 wherein the surface is inclined with a decreasing height towards an edge of the carrier element opposite to the opening.

18. The X-ray source of claim 14 wherein an edge of the surface along the opening is rounded.

19. The X-ray source of claim 14 wherein the at least one groove is a plurality of concentric grooves.

20. The X-ray source of claim 19, wherein at least one of said plurality of concentric grooves has a larger cross-section than another of said plurality of concentric grooves.

* * * * *